Aug. 7, 1945. E. E. HOWE 2,381,748
METHOD OF FORMING JOINTS
Original Filed Nov. 2, 1942 2 Sheets-Sheet 1
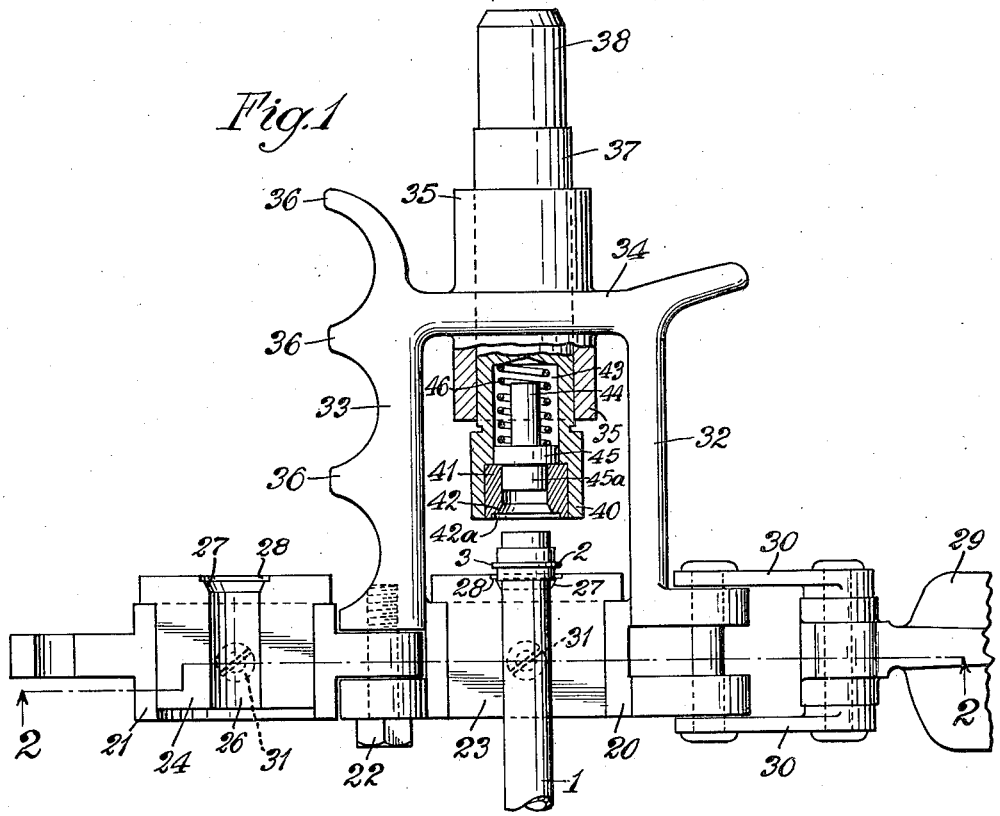
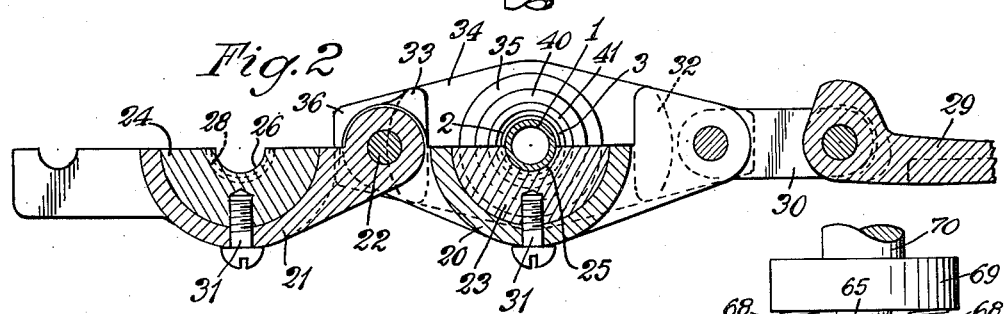
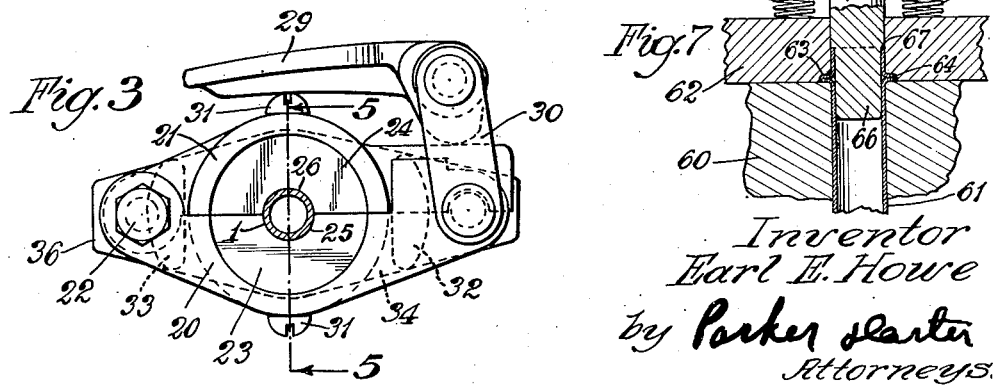
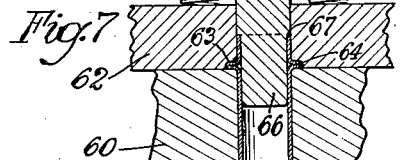
Inventor
Earl E. Howe
by Parker & Carter
Attorneys

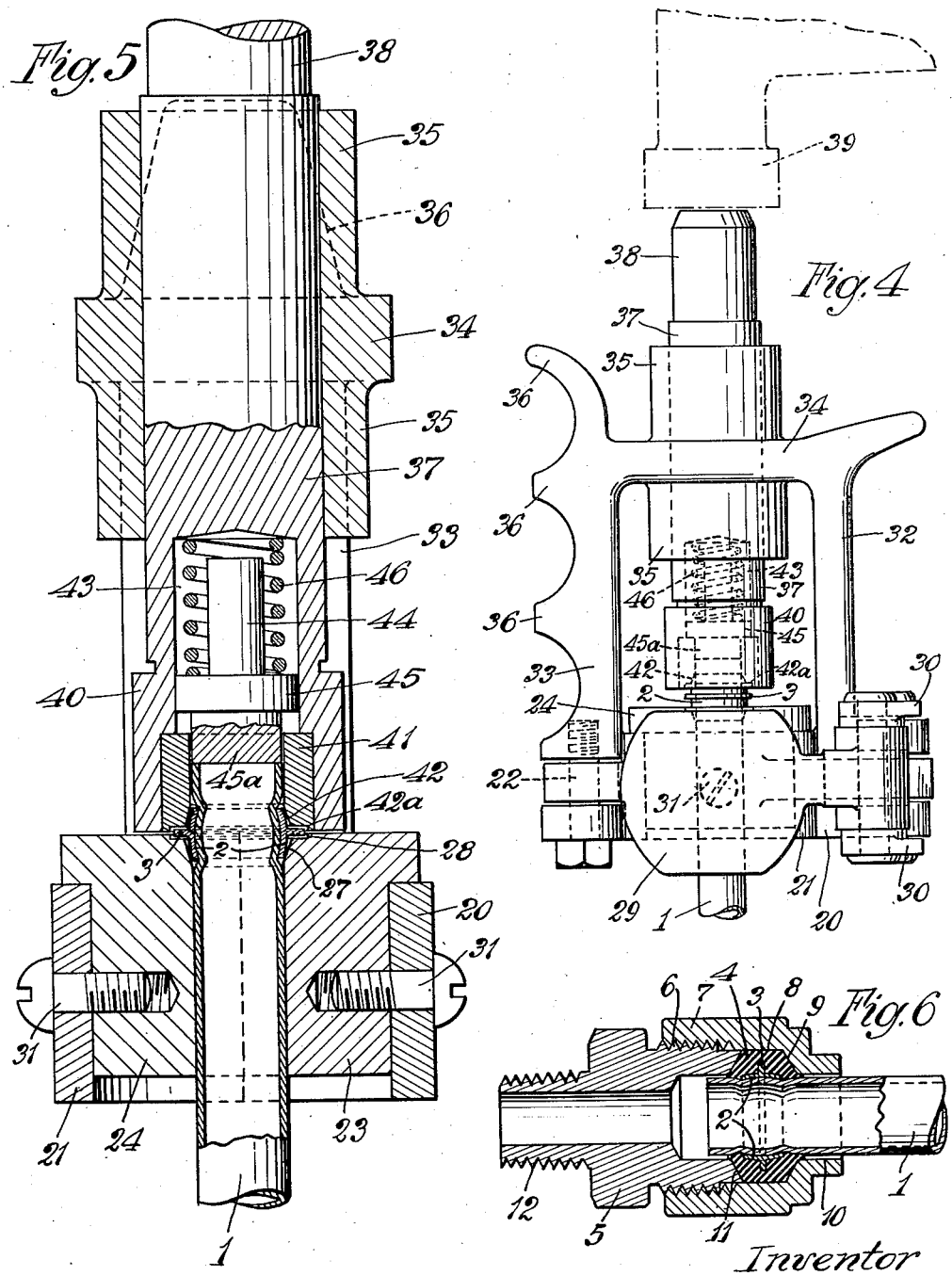

Patented Aug. 7, 1945

2,381,748

UNITED STATES PATENT OFFICE 2,381,748

METHOD OF FORMING JOINTS

Earl E. Howe, Chicago, Ill., assignor to Chicago Forging & Manufacturing Company, Chicago, Ill., a corporation of Illinois Original application November 2, 1942, Serial No. 464,183. Divided and this application May 10, 1943, Serial No. 486,463

5 Claims. (Cl. 29—148)

My invention relates to an improved method of forming a high pressure resistant flexible joint or connection for tubing and the like.

One purpose of the invention is the provision of an improved method of forming such joints, which may be carried on in the field with a variety of relatively simple tools.

Another purpose of the invention is the provision of an improved method adapted for field repairs, in which a minimum of skill or special training or equipment is necessary.

The present application is a division of my co-pending application Serial No. 464,183, filed November 2, 1942, and that application contained material divided from my original application Serial Number 416,235, filed October 23, 1941, and issued on the 10th of November, 1942, as Patent No. 2,301,280.

I illustrate my invention more or less diagrammatically in the accompanying drawings, wherein—

Figure 1 is a plan view with parts in section illustrating the tool with a tube end in position and the tool open;

Figure 2 is a section on the line 2—2 of Figure 1;

Figure 3 is an end view of the tool, with the tool closed about the end of a tube;

Figure 4 is a plan view illustrating the tool closed and the operating portions of the tool in position;

Figure 5 is a section on the line 5—5 of Figure 3, with the parts in the forming position;

Figure 6 is an axial section through the final joint;

Figure 7 is an axial section through a variant form of die, for extruding an integral fin.

Like parts are indicated by like symbols throughout the specification and drawings.

Referring to the drawings, it will be understood that the final joint is formed by a tube 1 having a ferrule 2, applied adjacent the end of the tube, the ferrule having a rib 3 extending outwardly therefrom. Surrounding the rib and ferrule and the adjacent portions of the tube is a washer 4 of rubber or other suitable substance. It will be understood that in the final joint, which resembles the joint shown in my Patent No. 2,301,280, the pressure chamber surrounds the washer 4. In the joint of Figure 6, this pressure chamber is formed by a fitting 5 exteriorly screw threaded as at 6 to receive the interiorly screw threaded locking member 7, which is shown as having a generally cylindrical inner wall 8 and a tapered end wall 9, terminating in an aperture 10 of slightly greater diameter than the outside diameter of the tube 1. The fitting 5 has a tapered end wall 11.

When the members 5 and 7 are relatively rotated in the proper direction, they are compressed to form a pressure chamber which is entirely filled by the washer 4. The clearance between the inner bores of the members 5 and 7 is insufficient to permit any substantial escape or outward squeezing of the rubber, but the fit is sufficiently loose to permit ready application and removal. It will be understood that rubber or any suitable rubber substitute may be employed, the washer being preferably flexible and compressible, but not so soft as to be readily extruded through the above mentioned clearance space.

The fitting 5 may at its outer end be exteriorly screw threaded, as at 12, but it will be understood that the means for securing it to an adjacent tube, container, or the like may be varied to suit the particular circumstances involved.

In the formation of the joint the ferrule 2 is secured to the end of the tube 1. It will be understood that preferably the tube is of thin gauge stock and to some extent flexible. The ferrule is slipped over the end of the tube, the ferrule being preferably snugly fitted to the tube, but not so snugly as to resist axial relative movement. The tube with the ferrule on it is then seated in the tool described below, and the annular portion of the ferrule is compressed and driven slightly into the face of the tube 1 to provide a preferably slight interlock. A variant method is to form a rib integrally on the tube, for example, by deforming the tube. Another method is to secure a rib directly to the tube, without a ferrule to carry it.

Thereafter the tube with the ferrule now attached to it is removed from the tool, and the washer 4 is placed thereabout; or the washer is placed about the integral rib, or directly secured rib, above described. The annulus 7, which should be slipped on the tube before the ferrule is applied, or before the integral rib is formed, is then moved against or about the washer, and the parts 5 and 7 are screwed together. They are screwed with sufficient force to constrain the washer to occupy the entire space in the pressure chamber thus formed. Preferably the height or radial extension of the rib 3 is somewhat greater than the clearance between the tube 1 and the bores of the two members which form the pressure chamber. It is desirable, in any event, that the parts be so proportioned that the portion of the washer between each side of the rib and the opposite end wall of the pressure chamber be directly compressed between the faces thus formed. It will be understood that the use of a simple washer is practical, but that a split or a segmental ring may be employed. In fact, the rubber or other suitable distortable mass may be applied in a variety of forms or shapes.

The tool includes two hinged shell portions 20 and 21 pivoted to each other as at 22. In each one is a generally cylindrical block or half bushing 23, 24, with a semi-cylindrical bore 25, 26. When the two are in the position in which they are shown in Figure 3, they, therefore, define a cylindrical bore adapted somewhat loosely to receive the tube 1. Each such half bushing or block is tapered at one edge, as at 27, and has a counter bore 28 adapted to receive the rib 3 when it is in the position in which it is shown in Figure 5. Any suitable means may be employed for locking the members 20, 21 together, but I illustrate a locking lever 29 pivoted to a pair of links 30, which in turn are pivoted to the end of the member 20 opposite to the pivotal connection 22. Figure 3 illustrates the parts in closed position. It will be understood that the half bushings 23, 24 may be removably held in position, as by the screws 31.

Extending endwise from the member 20 is a yoke having side elements 32, 33, and an end element 34, carrying hubs 35. The member 33 is formed with finger receiving elements 36 for convenience in use. When the tool is grasped, the palm of the hand keeps the locking lever in locked position.

Slidably mounted in the hub 35 is a plunger element 37, having an end member 38 adapted to receive the impact of any suitable hammer or tool 39. It has an enlarged inner end 40, in which is received a sleeve 41 having a bore of substantially the same diameter as the bore of the members 23, 24. It is also tapered or enlarged, as at 42, to conform generally to the taper 27 of the members 23, 24, and counter-bored as at 42a to receive the rib 3 of the ferrule 2. The member 37 also has an end bore 43 of a diameter somewhat greater than the bore in the member 41. Movable in this bore 43 is a guide pin 44, having a piston head 45 conforming generally to the shape of the bore 43. A coil spring 46 tends normally to move the head 45 against the inner ends of the member 41, which member 41 may be pressed into or otherwise secured in the end 40 of the plunger 37.

In using the tool, after the ferrule has been slipped on the end of the tube, the tube is positioned in the bore of the members 23, 24, they being thereafter locked together, as shown in Figure 3. The tube may be thrust in until its end contacts the head 45, or its outward extension 45a, which penetrates the bore of the element 41, and serves as an abutment for positioning the end of the tube. When the parts are thus positioned, with the end of the tube engaging the abutment 45a and the outer edge of the ferrule 2 engaging the member 41, the inner edge of the ferrule at the same time engaging the members 23 and 24, a sharp stroke with the hammer 39 against the end element 38 will force the edges of the ferrule into the metal of the tube 1 and position the parts as shown in Figure 5. At the same time the tube is not forced back by the stroke because the end of the tube engages the positioning member 45a and that member can move in relation to the plunger 37.

After the stroke the tool is released, the rubber washer is positioned, and the joint can be completed, as shown in Figure 6.

It will also be understood that with slight changes, the tool may be employed to extrude or flex a fin of metal outwardly from the body of the tube itself. What is essential is that some projection may be made in or applied to the tube in order to anchor the washer in position. For example, I illustrate in Figure 7, a holding die 60, which holds the end of the tube 61. It may be a two part die or clamp, or other means may be employed to hold the tube against endwise movement. Associated with it is a second die 62, the two dies defining an aperture 63, into which a fin 64 may be extruded. 65 is a punch, with a reduced end portion 66. The shoulder 67 engages the end of the tube 61. 68 are any suitable punch returning springs, engaging the cross member 69. 70 is the punch end which may be struck or urged in a forming excursion.

It will be realized that while I have described and shown a practical and operative mechanism useful in carrying out my method, many changes made be made in the mechanism as to size, shape, number and disposition of parts or variant mechanisms may be employed. I therefore wish my description and showing to be taken as in a broad sense illustrative and diagrammatic rather than as limiting means to my precise showing.

The use and operation of my invention are as follows:

I provide a method of forming a joint which is applicable for securing tubing, for example pressure tubing. It is useful, for example, in the manufacture and operation of airplanes, tanks, engines, pumps, and the like. An advantage of my invention is that the joints can be quickly and easily applied and also quickly and easily broken and re-applied without damage to the parts. A further advantage is that the joints can be made easily in the field, a hand tool being provided for securing the ferrule to the tubing.

Where the joints are made at the factory the ferrule might be secured by other means, for example brazing, welding, or the like, or the rib may be directly secured to the tube, but I find the tool herein described a very convenient and practical way for permitting a user in the field to apply to the end of a tube a ferrule which cooperates with the final joint. The use of an integral rib is also practical.

In order to release the joint, all that is necessary is to unscrew the pressure annulus 7, and thus break the pressure chamber. As the end of the tube 1 penetrates only a very slight distance into the fitting 5, this type of joint is particularly convenient for use in confined spaces such as the interior of a tank. The tube 1 can in that event be laterally flexed out of line with the fitting 5, with a minimum of endwise withdrawal.

It will also be understood that in the practice of my invention whereas the application of a ferrule to the end of the tube is a useful and simple solution, I wish it understood that a rib or projection may be formed in the tube itself, as shown in Figure 7.

I claim:

1. The method of forming a joint which includes providing a tube and a ferrule having an outwardly extending surrounding rib, positioning the ferrule on the tube and sliding it to position adjacent an end of the tube, forcing the opposite edges of the ferrule inwardly into the wall of the tube, surrounding the ferrule and both sides of the rib, with a mass of flexible distortable material, thereafter forming about said mass a compression chamber and forcing the walls of said chamber together until the chamber is completely filled by said mass, while preventing any substantial extrusion of the mass from the pressure chamber.

2. The method of forming a joint which includes providing a tube, providing said tube, adjacent an end thereof, with a circumferential outward projection, surrounding both sides of the exterior of the projection with a mass of flexible distortable material, thereafter forming a compression chamber about said mass and about the tube, while maintaining a clearance between the tube and the aperture of the pressure chamber through which it projects, which is less than the radial outward extension of the projection from the tube, forcing the walls of the chamber together until the chamber is filled by said mass and maintaining said mass under such pressure as to hold it in close and simultaneous sealing relationship with the projection, the interior walls of the chamber, and the enclosed portion of the tube.

3. The method of forming a joint for tubes, which includes providing a thin walled metal tube, supporting said tube against inward collapse and at the same time subjecting the end of the tube to longitudinal thrust, and thereby outwardly buckling the tube wall to form a projecting rib, limiting the outward movement of the metal thus buckled, to control the shape and diameter of the rib, thereafter positioning about the exterior of the rib and of the adjacent portion of the tube a mass of flexible distortable material, thereafter forming a compression chamber about the mass and forcing the walls of the chamber together until the chamber is substantially filled by the mass, while keeping the chamber out of direct contact with the tube.

4. The method of forming a joint for flexible tubes which includes providing a thin walled tube, sliding on said tube an annular ferrule having an outwardly extending circumferential rib, positioning the ferrule on the tube at a point adjacent but spaced inwardly from an end of the tube, inwardly distorting the opposite edges of the ferrule in unison and forcing said opposite edges, at the same time, inwardly into the wall of the tube and thereby locking the ferrule against movement on the tube, thereafter surrounding the ferrule, and both sides of the rib of the ferrule, with a mass of flexible distortable material, thereafter positioning about said mass a plurality of compression chamber members and forcing said members together until the space defined between said members and the tube and the ferrule is completely filled by said mass of flexible distortable material, while preventing any substantial extrusion of the mass from the pressure chamber, and while subjecting substantially the entire area of said mass to continuous pressure.

5. The method of forming a joint for flexible tubes which includes providing a thin walled tube, sliding on said tube an annular ferrule having an outwardy extending circumferential rib, positioning the ferrule on the tube at a point adjacent but spaced inwardly from an end of the tube, inwardly distorting the ferrule and forcing a portion of the ferrule inwardly into the wall of the tube, and thereby locking the ferrule against movement on the tube, thereafter surrounding the ferrule and both sides of the rib of the ferrule, with a mass of flexible distortable material, thereafter positioning about said mass a plurality of compression chamber members and forcing said members together until the space defined between said members and the tube and the ferrule is completely filled by said mass of flexible distortable material, while preventing any substantial extrusion of the mass from the pressure chamber, and while subjecting substantially the entire area of said mass to continuous pressure.

EARL E. HOWE.